April 16, 1968 W. E. KEMP 3,378,422
METHOD OF FORMING A PERMEABLE STRUCTURE
Filed June 29, 1964 2 Sheets-Sheet 1

INVENTOR.
WILLARD E. KEMP
AGENT

April 16, 1968     W. E. KEMP     3,378,422
METHOD OF FORMING A PERMEABLE STRUCTURE
Filed June 29, 1964     2 Sheets-Sheet 2

INVENTOR.
WILLARD E. KEMP
BY

AGENT

United States Patent Office 3,378,422
Patented Apr. 16, 1968

3,378,422
METHOD OF FORMING A PERMEABLE STRUCTURE
Willard E. Kemp, Bridgeton, Mo., assignor to ACF Industries, Incorporated, New York, N.Y., a corporation of New Jersey
Filed June 29, 1964, Ser. No. 378,549
5 Claims. (Cl. 156—247)

ABSTRACT OF THE DISCLOSURE

A method of making a permeable wall in place within an outlet structure with the permeable wall forming a portion of a plenum chamber. The method comprises securing a perforated rigid sheet to the outlet structure, applying a layer of adhesive to the perforated sheet, applying a deformable porous sheet on the layer of adhesive with a removable gas impermeable cover adhesively secured over the porous sheet, applying a vacuum from the plenum chamber with the vacuum drawing the porous sheet against the perforated sheet to form an integral permeable wall in place within the outlet structure. The gas permeable cover is peeled or stripped from the porous sheet after the forming of the permeable wall.

Background and description of the invention

Figure 1:
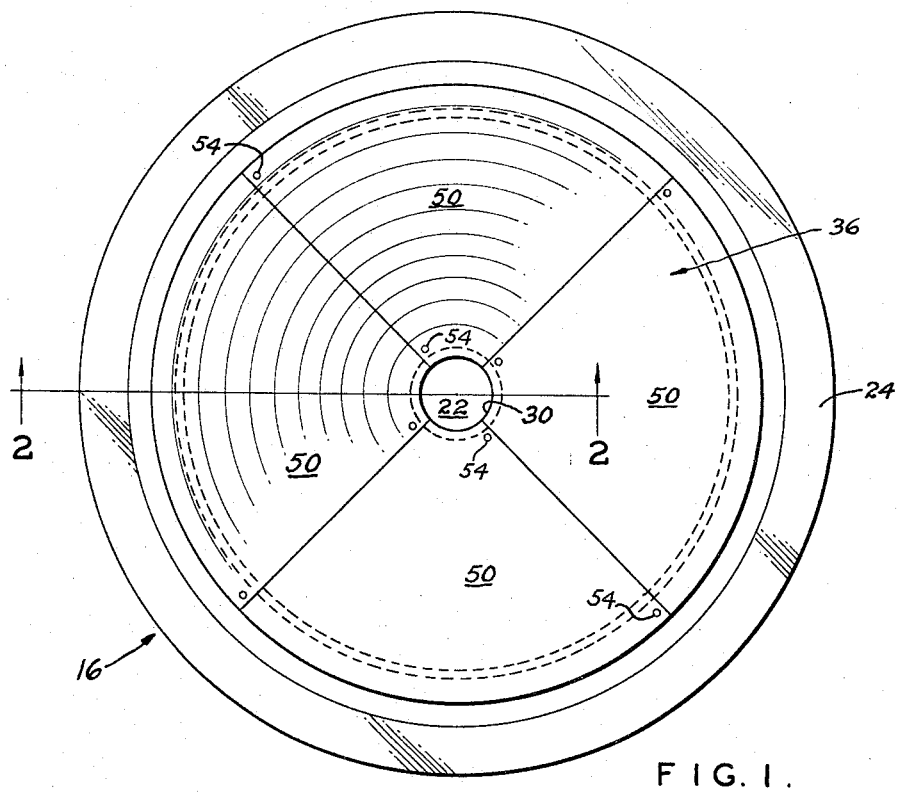

Heretofore, in a permeable structure forming a wall of a plenum chamber and comprising a pair of bonded sheets, one of the sheets being a perforated support sheet and the other being a porous sheet to permit gas to pass therethrough, it has been difficult to bind the two sheets together with a suitable adhesive, especially when the permeable structure is in position as a wall of a plenum chamber. The problem in bonding the two sheets occurs when there is any lateral slippage between the sheets as the adhesive is normally placed on the perforated sheet and if slippage between the sheets occurs the adhesive has a tendency to smear on the surface of the porous sheet exposed to the openings in the perforated sheet. This blocks or obstructs the flow of gas through the permeable structure undesirably affecting the permeability of the permeable structure.

The problem of adhesively bonding a porous or gas permeable sheet to a perforated support plate is particularly acute when the support plate is arcuate or irregular in shape. When an irregular surface is encountered on which the porous sheet is to be positioned, it is difficult to apply pressure, especially a uniform pressure, for pressing the sheets together and forming a strong bond. Many bonding agents, such as, for example, thermosetting adhesives, require a pressure in order to bond two surfaces adequately to each other.

As an example of a use for this method, reference is made to the application of Willard E. Kemp, Ser. No. 363,809, filed Apr. 30, 1964, now U.S. Patent No. 3,237,812 entitled Apparatus for Handling Bulk Materials, the entire disclosure of which is incorporated by this reference. In application Ser. No. 363,809 apparatus for handling bulk materials is disclosed having a plenum chamber with a permeable wall formed of a pair of bonded sheets. One of the sheets is an arcuate perforated support sheet and the other sheet is a porous sheet adhesively secured to the support sheet.

It is an object of the present invention to provide a method of adhesively securing two sheets together which form a permeable wall of a plenum chamber while the sheets are in place as a wall of a plenum chamber.

A further object of this invention is to provide a method of adhesively securing two sheets together to form an integral gas permeable structure without any lateral slippage between the sheets as the sheets are formed into the permeable structure.

An additional object of this invention is to provide a method of forming an integral load bearing structural member as a permeable wall of a plenum chamber by adhesively securing two sheets together in place.

Another object is the provision of a method for adhesively securing a deformable gas permeable sheet onto the irregular surface of a perforated support sheet.

Briefly, the process comprises applying a layer of adhesive over a surface of a substantially rigid perforated support sheet, placing a porous gas permeable sheet over the layer of adhesive, applying a vacuum from the side of the perforated sheet opposite the gas permeable sheet to draw the gas permeable sheet tightly against the layer of adhesive on the perforated support sheet to minimize any slippage and smearing of adhesive between the sheets, and then curing the sheets at a predetermined temperature for a predetermined time while the vacuum or a pressure differential is applied. The sheets are initially placed in position as the wall of a plenum chamber and a vacuum is applied to the plenum chamber thereby to form the permeable structure in place as a wall of a plenum chamber.

The invention accordingly comprises the methods and processes hereinafter described, the scope of the invention being indicated in the following claims.

Figure 2:
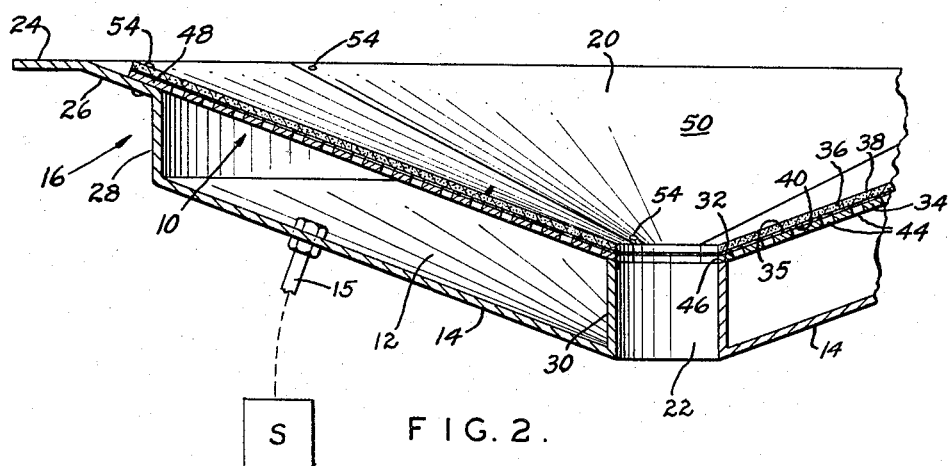
Figure 3:
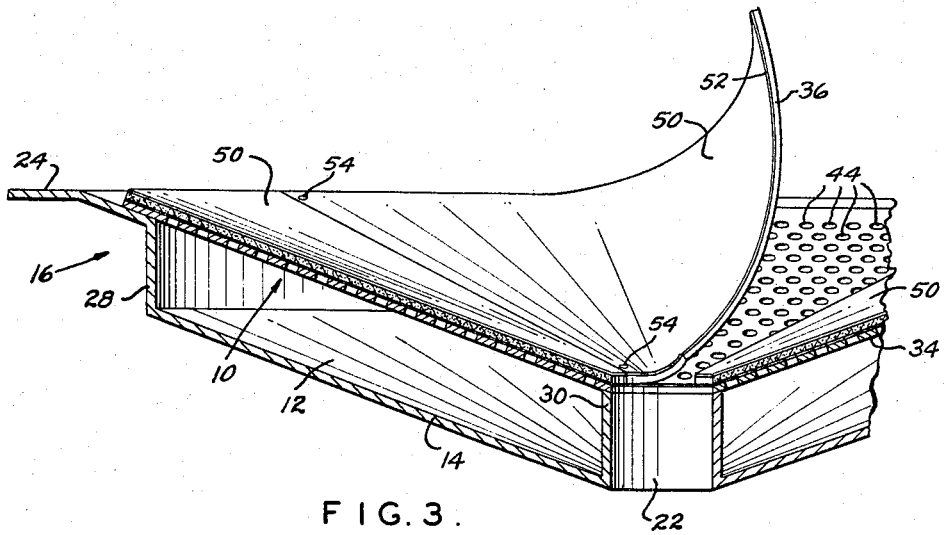
Figure 4:
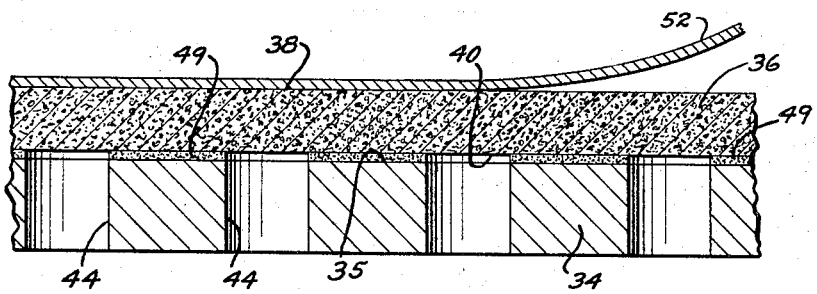

In the accompanying drawings;
FIGURE 1 is a top plan of an outlet structure having a plenum chamber with a permeable wall made by this method;
FIGURE 2 is a section taken generally along line 2—2 of FIGURE 1 and showing the plenum chamber with the permeable wall formed by the present method;
FIGURE 3 is a fragmentary sectional view similar to FIGURE 2 but showing only one segment of the permeable structure in position within the outlet structure in an intermediate step of the method with the porous sheet being secured to the perforated sheet along a side marginal portion of the porous sheet immediately before adhesively securing the two sheets together to form an integrally bonded permeable structure; and
FIGURE 4 is a sectional view taken through the permeable wall forming a portion of the plenum chamber and formed in accordance with the method hereinafter set forth.

Corresponding reference characters indicate corresponding parts throughout the several views of the drawings.

The present method is especially directed to the making of a permeable wall of a plenum chamber. The permeable wall formed by the method constituting this invention is indicated generally at 10 and forms a side of a plenum chamber 12. Plenum chamber 12 has a bottom wall 14 and a conduit 15 is connected to a suitable source S of subatmospheric pressure to provide a vacuum or suction within plenum chamber 12. As a non-limiting example of a use of such a plenum chamber, an outlet structure indicated generally 16 houses plenum chamber 12. Material or lading to be unloaded from a superjacent hopper structure enters upper or inlet end 20 of the outlet structure and is discharged through opening 22 which forms the outlet end of outlet structure 16. Outlet structure 16 has an upper annular flange 24 which may be suitably secured to the underside of a hopper structure (not shown). Integrally connected to flange 24 is a supporting ledge 26 leading to annular rim 28. Rim 28 merges with bottom wall 14 of outlet structure 16. Opening 22 is formed by a lower circumferential wall 30 having an upper surface 32 on which wall 10 is supported along its lower end marginal portion.

Permeable wall 10 is a composite, integrally bonded structure comprised essentially of a perforated support sheet 34 and a porous, gas permeable sheet 36 adhesively secured to the adjacent face of support sheet 34 along substantially the entire facing surfaces of sheets 34 and 36 to form an integrally bonded sandwich. Porous sheet 36 has generally parallel faces 38 and 40 and an upper surface 35 of sheet 34 is in contact with facing surface 40. Upper face 38 forms a material supporting surface, the material to be unloaded being supported on face 38 and moving therealong to outlet 22. Gas permeable sheet 36 is formed of a fiber metal material in which metallic fibers, such as stainless steel fibers, having a length to diameter ratio of at least 10 to 1, and as high 2,000 to 1, are individually dispersed and felted to form a random, interlocked nonwoven body. The nonwoven body is then sintered under reducing conditions at a high temperature, such as 2400° F., to produce welds or metallic diffusion bonds at interfiber contact points. A suitable material for sheet 36 is shown and described in U.S. Patent No. 3,127,668 issued Apr. 7, 1964, the entire disclosure of which is incorporated by this reference. As porous sheet 36 is sometimes bonded to an irregular or arcuate surface, it is desirable that sheet 36 be somewhat flexible to permit a relatively tight fit against the contour of sheet 34 which is generally rigid.

The porosity of a porous medium is the percentage of voids expressed as a ratio of the volume of voids to the total volume of the medium. Void or pore volumes are usually determined by measuring the amount of liquid needed to saturate the dry medium. The porosity or percentage of voids is around 70% to give sheet 36 a solid content of around 30%. A thickness of sheet 36 of around $1/16''$ and of a maximum not substantially exceeding $1/8''$ has been found satisfactory for handling pulverulent materials, such as cement and flour. Wall 10 may have a relatively large span or unsupported dimension between rim 28 and circumferential wall 30. The weight of the material to be unloaded, such as, for example, the lading within a hopper structure, is oftentimes relatively large and forms a substantial dead load on the wall. Further, it is sometimes desirable for workmen to be supported on wall 10, such as during a cleaning or repair operation. Thus, wall 10 should be substantially rigid and an integral load carrying structural member for best results.

To accomplish the foregoing, perforated support plate 34 is substantially rigid and is generally coextensive with sheet 36. Perforations 44 extend through sheet 34 and comprise around 60% of the entire surface area of sheet 34. It is desirable to have as much of the surface area of sheet 34 perforated as possible to permit increased diffusion of gas through permeable sheet 36. If over around 60% of the area of plate 34 is perforated, the supporting strength of the sheet is reduced to an undesirable level. Sheet 34 may be formed of a high strength steel or of other materials having a sufficient supporting strength for gas permeable sheet 36, such as a suitable plastic.

To form wall 10 of plenum chamber 12 and constituting this invention, a perforated sheet 34 which may be frusto-conical in shape or formed of a plurality of segments is first secured in position around outlet structure 16. For securing sheet 34, the lower marginal portion 46 of sheet 34 may be welded to supporting surface 32 of circumferential wall 30. An upper marginal portion 48 is secured, such as by welding, along supporting ledge 26 of outlet structure 16. Next, upper surface 35 of sheet 34 is coated with a suitable adhesive 49. For example, an adhesive which has been found to be satisfactory for bonding sheets 34 and 36 is adhesive EC–2214 manufactured and sold by Minnesota Mining and Manufacturing Company. Adhesive EC–2214 is a thermosetting liquid adhesive having high strength properties at service temperatures from minus 70° F. to 200° F. The adhesive has an epoxy resin base and may be applied by a brush, knife coating, spatula, or trowel, for example. A thickness of adhesive coating 49 of around about 0.005 inch has been found satisfactory.

As supporting sheet 34 is generally frusto-conical in shape, it is desirable to form sheet 36 in a plurality of generally flat segments 50 which will fit on and closely follow the arcuate contour of surface 35 on sheet 34. Further, since the vacuum will be applied from plenum chamber 12, sheet 36 should be substantially gas impermeable during the forming of wall 10. To make segments 50 of sheets 36 temporarily gas impermeable, protective cover 52 is removably secured, such as by a suitable water soluble adhesive, to the upper surface 38 of each segment 50 as shown particularly in FIGURE 4. Aluminum foil has been employed satisfactorily as cover 52 and may be held in contact with sheet 36 by the vacuum alone or with a suitable water soluble adhesive.

In the event sheet 36 positioned on adhesive coating 49 slips laterally relative to support sheet 34, a portion of the adhesive coating 49 will smear along undersurface 40 of sheet 36 into the surface area directly superjacent perforations 44. The smearing of the adhesive will tend to clog or obstruct the flow of air through sheet 36. The present method of securing sheets 34 and 36 to each other prevents slippage of the sheets relative to each other and thereby results in a maximum permeability for wall 10. The term "permeability" is defined as "the amount of air measured in cubic feet and at 70° F. and 25% relative humidity which will pass through the area of one square foot of wall 10 in one minute when tested under an equivalent pressure differential of two inches of water." A permeability of around ten (10) for wall 10 has been found to be satisfactory for handling finely-divided particles arranging in size between about 10 and 100 microns.

As generally flat segments 50 are not preformed to the exact contour of generally rigid support sheet 34 and are flexible to a certain extent, the segments are first preformed manually to conform approximately to the arcuate contour of support sheet 34 which is generally frusto-conical in shape. Next, a side marginal portion of each segment 50 is secured, such as by rivets 54, to support sheet 34. Rivets 54 may be matched with perforations 44 or additional openings may be drilled in sheet 34 to receive rivets 54. Normally, two rivets 54 are adequate to hold a segment 50 in position. With a side marginal portion of each segment 50 secured, the segments are rolled laterally along upper surface 35 of sheet 34 to fit closely and tightly against surface 35. A vacuum of around 14 inches of Hg is applied though conduit 16. When each segment 50, which, for example, may be a quadrant, is secured in place against sheet 34, the vacuum holds the entire sheet 36 tightly against surface 35.

Outlet structure 16 with the vacuum continuously applied is then placed in an atmospheric furnace and heated at a temperature of around 250° F. for thirty (30) minutes. The adhesive comprising adhesive coating 49 is thus cured and forms a tight bond between sheets 34 and 36. Next, outlet structure 16 is removed from the furnace and allowed to cool. The outlet structure may be tested by applying a minimum of 250 cubic feet of air a minute to the inlet and the air flow should be uniform. The protective cover 52 is removed when the outlet structure 16 is removed from the furnace. If desired, a pressure may be applied to outlet structure 16 when it is placed within a furnace or suitable heating chamber. The pressure should be sufficient to hold sheet 36 in position and will eliminate the necessity of applying a vacuum while the adhesive is being cured.

Thus, permeable sheet 36 is bonded to a generally arcuate surface formed by sheet 34 and forms an integrally bonded rigid sandwich therewith. Permeable sheet 36 by being slightly flexible can be easily fitted onto the adjacent contour of support sheet 34. Further, no slippage occurs between sheets 34 and 36 by the present method of bonding the sheets together in place as a wall of a plenum chamber, such as, for example, an outlet structure for unloading finely-divided materials. When the permeable wall is formed, the entire outlet structure is completed for attachment to the underside of a hopper structure or the like. The permeable wall by being formed of two sheets along substantially their entire contacting surfaces forms an integral load bearing structural member which permits a relatively large unsupported span for the wall.

The porous or permeable sheet, as defined in the specification and claims herein, is interpreted as including a porous sheet having a removable protective cover which renders the sheet gas impermeable during the making of the permeable wall.

As various changes could be made in the above methods without departing from the scope of the invention, it is intended that all matter contained in the above description or shown in the accompanying drawings shall be interpreted as illustrative and not in a limiting sense.

In view of the above, it may be seen that the several objects of the invention are achieved and other advantageous results obtained.

I claim:

1. The method of forming a permeable wall of a plenum chamber in place within an outlet structure comprising applying a layer of a thermoactive adhesive to one surface of a perforated support sheet over a plenum chamber of the outlet structure, applying a vacuum from the plenum chamber on the opposite surface of said perforated sheet, adhesively securing a gas impermeable cover to one surface of a porous sheet, placing the porous sheet and gas impermeable cover on the adhesive in face-to-face contact with the perforated sheet, the vacuum drawing the porous sheet tightly against the perforated sheet, curing the thermoactive adhesive at a predetermined temperature for a predetermined time, maintaining a pressure differential on opposite sides of the permeable wall during the curing of the adhesive whereby an integrally bonded permeable structure is formed in place within the outlet structure, and peeling the gas impermeable cover from the porous sheet after the curing of the thermoactive adhesive.

2. The method of making an arcuate permeable wall of a plenum chamber in place within an outlet structure which comprises securing a preformed substantially rigid support sheet having an irregular contour as a portion of the permeable wall of said plenum chamber, applying a layer of an adhesive to one surface of the perforated sheet, adhesively securing a gas impermeable cover to one surface of a deformable porous sheet, securing a marginal portion of the deformable porous sheet and impermeable cover secured thereto, applying a vacuum from the opposite surface of said perforated sheet, deforming the porous sheet into the irregular contour of the adjacent support sheet, the vacuum drawing the porous sheet tightly against the perforated sheet whereby an integral permeable structure is formed in place within the outlet structure, and peeling the gas impermeable cover from the porous sheet after the permeable wall is formed.

3. The method of making an arcuate permeable wall of a plenum chamber in place within an outlet structure forming the plenum chamber which comprises, securing a preformed substantially rigid support sheet having an irregular contour as a portion of a permeable wall of the plenum chamber, applying a layer of a thermosetting adhesive to one surface of the perforated sheet, adhesively securing a gas impermeable cover to one surface of a deformable porous sheet, securing a marginal portion of said deformable porous sheet adjacent the support sheet, applying a vacuum from the opposite surface of said perforated sheet, deforming the porous sheet into the contour of the adjacent support sheet, the vacuum drawing the porous sheet tightly against the perforated sheet, curing the thermosetting adhesive at a predetermined temperature for a predetermined time, maintaining a pressure differential on opposite sides of the permeable wall during the curing of the adhesive whereby an integrally bonded arcuate permeable structure is formed in place within the outlet structure, and peeling the gas impermeable cover from the porous sheet after the permeable wall is formed.

4. The method of making an in-place permeable wall for a plenum chamber which encircles a bottom discharge outlet in an outlet structure comprising, securing a perforated substantially rigid arcuate support sheet as a portion of the permeable wall extending about the inner perimeter of the outlet structure, applying a layer of a thermoactive adhesive to the outer sloping surface of the perforated sheet, adhesively securing a gas permeable cover to one surface of a deformable porous sheet, securing a plurality of generally flat segments of said deformable porous sheet about one of their marginal portions at a position adjacent the perforated support sheet, applying a vacuum from the plenum chamber, deforming the segments of the porous sheet into the contour of the adjacent arcuate support sheet, the vacuum drawing the segments tightly against the perforated sheet, placing the outlet structure in a heat chamber at a predetermined temperature for a predetermined time, maintaining a pressure differential on opposite sides of the permeable wall during the curing of the adhesive whereby an integrally bonded arcuate permeable wall is formed in the outlet structure, and peeling the gas impermeable cover from the porous sheet after the permeable wall is formed.

5. The method of making an arcuate permeable wall of a plenum chamber which comprises securing a preformed substantially rigid support sheet having an irregular contour as a portion of a permeable wall of a plenum chamber, applying a layer of an adhesive to one surface of the perforated sheet, applying a gas impermeable cover to one surface of a deformable porous sheet, securing a marginal portion of the porous sheet and cover to the perforated sheet with the other surface of the porous sheet adjacent the perforated sheet, applying a vacuum from the opposite surface of said perforated sheet, deforming the porous sheet into the irregular contour of the adjacent support sheet, the vacuum drawing the porous sheet tightly against the perforated sheet, curing the thermosetting adhesive at a predetermined temperature for a predetermined time, maintaining a pressure differential on opposite sides of the permeable wall during the curing of the adhesive whereby an integral permeable structure is formed, and removing the gas impermeable cover from the porous sheet after the curing of the adhesive.

References Cited

UNITED STATES PATENTS

| | | | |
|---|---|---|---|
| 2,647,399 | 8/1953 | Newbill | 73—88 |
| 2,705,523 | 4/1955 | Hasselquist | 156—497 XR |
| 2,978,376 | 4/1961 | Hulse | 156—286 XR |

EARL M. BERGERT, *Primary Examiner.*

H. F. EPSTEIN, *Assistant Examiner.*